Feb. 17, 1970  J. S. LYLE  3,495,816
VARIABLE RATE SPRING REINFORCED STRUCTURAL MEMBER
Filed June 22, 1967  2 Sheets-Sheet 1
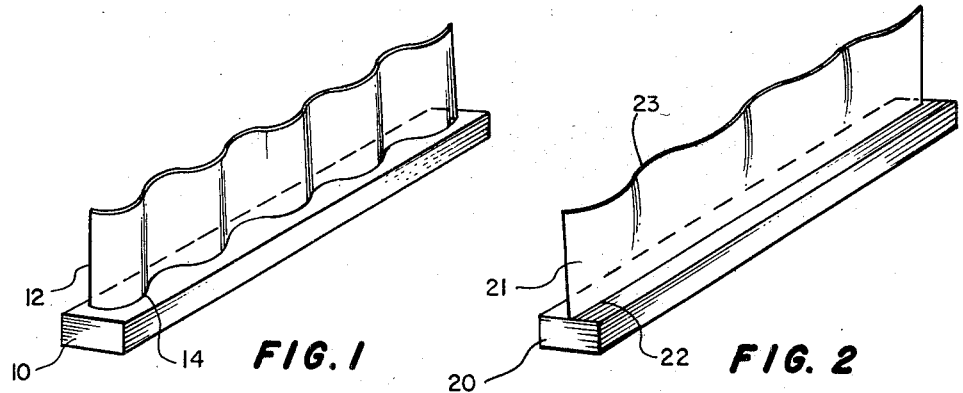
FIG. 1
FIG. 2
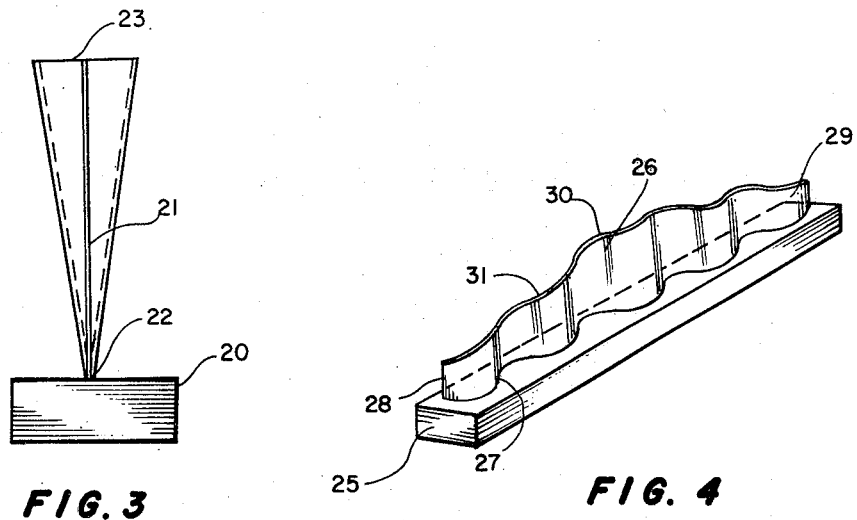
FIG. 3
FIG. 4
INVENTOR.
JOHN S. LYLE
BY
ATTORNEY Feb. 17, 1970  J. S. LYLE  3,495,816
VARIABLE RATE SPRING REINFORCED STRUCTURAL MEMBER
Filed June 22, 1967  2 Sheets-Sheet 2

INVENTOR.
JOHN S. LYLE
BY
*Richard D. Law*
ATTORNEY

United States Patent Office 3,495,816
Patented Feb. 17, 1970

3,495,816
VARIABLE RATE SPRING REINFORCED STRUCTURAL MEMBER
John Stuart Lyle, 1939 Grove St., Denver, Colo. 80204
Filed June 22, 1967, Ser. No. 648,014
Int. Cl. F16f 1/02; E04c 3/07
U.S. Cl. 267—1            10 Claims

ABSTRACT OF THE DISCLOSURE

A beam of spring structural member having a primary structural element and a secondary reinforcing element comprised of a relatively thin corrugated element attached to the primary structural element so that the corrugations are essentially parallel to the loading direction provides a composite member which changes its spring rate or stiffness under variable load conditions. The primary structural element member may be a flat bar, round bar, pipe, tube, sheet, structural section, etc., and the secondary corrugated member may be a corrugated plate, strip, bar or the like securely fastened to the primary member as by welding and the like.

---

Most structural elements have a single spring rate or stiffness from zero load to their maximum load capacity, above which the elastic limit of the member is exceeded and the member will not return to its original position. For example, a cantilever spring has a straight line stiffness rate at all loads to its elastic limit. One of the few methods heretofore available to change the rate of the stiffness of a spring is by changing the length of the spring, as by means of a cam type fulcrum which provides a variable point of contact with the spring. Thus, the cam contacts the spring at one place when the spring is lightly loaded, and the cam is moved to reduce the length of the spring when a higher load value is applied. Another method is to provide a helper spring whereby the main spring will accommodate lighter loads, but when a heavier load is applied on the main spring it contacts the helper spring under the deflection of the higher load, which changes the rate of stiffness of the main spring and thus provides a two-rate spring. Frequently high load springs, or beams, are used with no provision made for the lower loads, although a low spring rate for the lower loads would be highly advantageous.

There are numerous disadvantages of a member having a single spring or beam rate. For example, with a high load, a high rate spring produces increasing harshness of the loading when a light load is applied to the spring. Obviously, for the lighter loads a lightweight and less expensive spring would be the element of choice; however, when a spring must be subjected to a higher load, the lower load spring cannot be used. The use of the overload or helper spring actually produces a two-rate spring, but at moderate or intermediate loads the main spring may slap the spring stops or the overload springs. The cam used to shorten or lengthen the spring has certain disadvantages, as it is applicable only for a limited change of spring rate, and, further, the spring can only support a one directional force. Thus, the spring may snap when the load direction changes abruptly. Further, severe wear may occur at the point of contact between the spring and the cam which, obviously, must be only friction contact to permit the moving of the cam on the spring.

According to the present invention, I have provided a structural member which can absorb large amounts of energy without imparting heavy shock loads to the connecting members. The invention provides a simple, economical means of producing a structural member which will change its spring rate or stiffness rate under applied loads and the structural member itself. Further, the invention is adaptable to a two directional structural member, and the natural frequency of a beam can be changed by the invention.

Included among the objects and advantages of the invention is to provide a structural member which will have a variable spring rate or variable stiffness rate under application of a variable load.

A further object of the invention is to provide a simple and economical means of producing a structural member having a variable spring rate under applied loads.

A still further object of the invention is to provide a structural member which provides a variable spring rate in two directions.

Another object of the invention is to proivde a structural beam in which the natural frequency may be changed by securing a corrugated web to the beam to thereby change its spring rate.

These and other objects and advantages of the invention may be readily ascertained by referring to the following description and appended illustrations in which:

FIG. 1 is a perspective view of one form of a beam or structural element having a variable spring rate according to the invention;

FIG. 2 is a modified form of a beam or structural element having a variable spring rate according to the invention;

FIG. 3 is an end elevation of the device of FIG. 2;

FIG. 4 is a still further modified form of the invention, which provides a beam having a variable spring rate which varies along its length;

Figure 5:
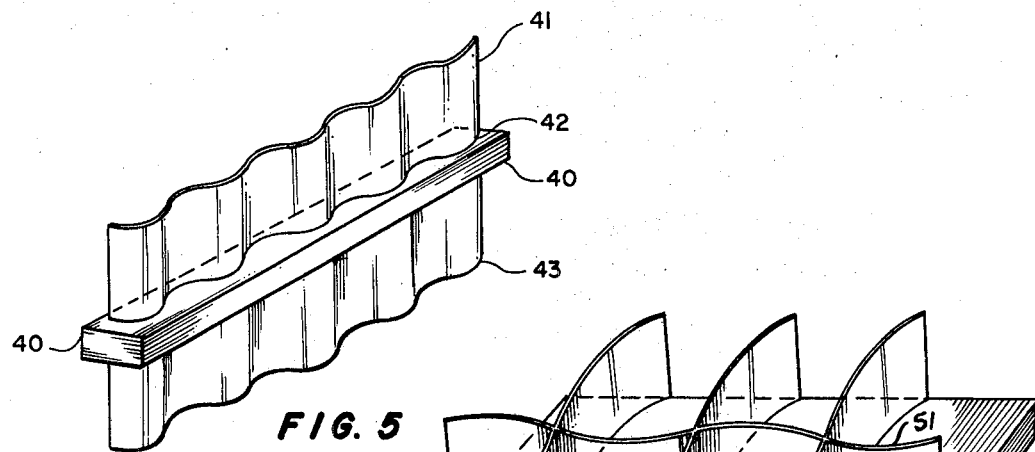
FIG. 5 is another modified form of a beam which provides for a variable spring rate in two directions of flexure of the beam.

In general, a simple beam, according to the invention, consists of two major parts, including a primary structural element which may, in cross-section, be a rectangular bar, a beam, rod, tube, pipe, structural section, flat plate or the like, and a secondary member which reinforces the primary member. The secondary member is, in most cases, secured to the primary member along its major axis, and this secondary member is an undulated, thin section element such as corrugated plate, corrugated strip, or the like. The secondary member is securely affixed to the primary member so that it becomes a part of the structural element itself.

The form illustrated in FIG. 1 includes a main, rectangular bar structural element 10 and a corrugated sheet is preferably welded continuously along its contact length metal secondary element 12 secured as by welding to the bar 10 along a weldment 14. The corrugated member 12 to the top of the bar member 10. The height of the corrugated member determines to some degree the overall change of rate of spring or stiffness, as a wider corrugated sheet (of the same thickness) has a tendency to produce less of an increase in the spring rate than a narrower width.

Figure 7:
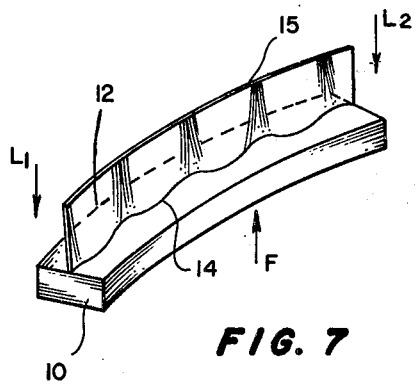
FIG. 7 is a schematic view of a beam, highly exaggerated, showing the action of the component members of the beam in one direction of deflection.
Figure 8:
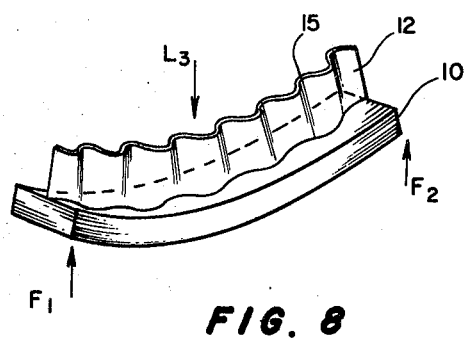
FIG. 8 is a schematic view, highly exaggerated, of the same beam of FIG. 7 in the reverse direction of flexure.

The operation of the reinforcing is illustrated in FIGS. 7 and 8. In FIG. 7 the beam 10 is deflected by the additions of loads $L_1$ and $L_2$ on its two ends, over a fulcrum F in the middle of the beam and against the opposite side. In this arrangement of loading, the beam is curved away from the corrugated sheet 12, tending to stretch the top 15 of the sheet 12, and, in other words, stretching out the undulations in the sheet 12. The stretching of the undulations increases the stiffness of the beam at an increasing rate, and as the top edge 15 approaches a straight line, the resistance against flexure of the beam increases at a greater substantial rate than the increase in the load. The increase of resistance to the flexure of the beam suddenly takes a jump when the top edge 15 is straight and there are no more undulations in the sheet 12. At this point further flexure causes a deformation or elongation of the top edge 15 and the tensile strength of the material of the sheet 12 adds to the resistance against flexure. In the opposite direction of flexure, however, as shown in FIG. 8, the beam is curved in the reverse direction. The beam ends rest on fulcrums $F_1$ and $F_2$, and a load $L_3$ is applied in the middle on the same side as the corrugated member 12. The flexure of the beam now increases the depth of the undulations and decreases their period. This squeezing of the undulations together adds very little strength to the beam, and it is minute compared to stretching of the undulations as shown in FIG. 7. Thus, the beam with a single web is essentially a one direction beam.

A modified form of beam is shown in FIG. 2, wherein a rectangular (in cross-section) beam 20 is provided with a web 21 secured thereto along a straight line weldment 22. The web 21 has an undulating or corrugated top 23. When the beam is flexed, in a manner siimlar to that of FIG. 7, the flexure of the beam tends to pull the undulations 23 into a straight line, thereby substantially increasing the resistance of the beam to flexure. This configuration of reinforced beam provides an easier welding job, since the weldment is in a straight line rather than in an undulating line such as the weldment of 14 of the beam of FIG. 1. The web may be crimped in conical rollers, providing the variable pitch undulation from edge to edge.

A further modification to the device of FIG. 1 is illustrated in FIG. 4, wherein a rectangular beam 25 is provided with an undulated web 26 secured to the beam by an undulating weldment 27. In this instance, however, the ends 28 and 29 of the web 26 are narrower than the middle section 30, with the top 31 of the flange or web 26 essentially arcuate, having a high point in the middle. This configuration may, also, be triangular shaped, with straight top edges ending in a point at the middle. Such configuration is useful for a beam where the major flexure is in the middle of the beam, since this particular web adds a greater strength to the middle of the beam than at the ends where there is very little flexure.

As described for FIGS. 7 and 8, the beam with a single web is essentially a one direction beam for increased resistance to flexure in one direction of flexure. A two direction deflection beam may be formed as shown in FIG. 5. A rectangular beam 40 is provided with an upper web 41 secured to the beam 40 along weldment 42 and a web 43 is secured to the opposite side of the beam 40 by its weldment. The webs 41 and 43 are corrugated sheet and securely fastened to and become part of the beam 40. Flexure of the beam toward either web causes the other web to stretch out its undulations, adding variable resistance to flexure by that web, and flexure in the opposite direction reverses the process in the opposite web stretches, adding resistance to flexure of the beam.

Figure 6:
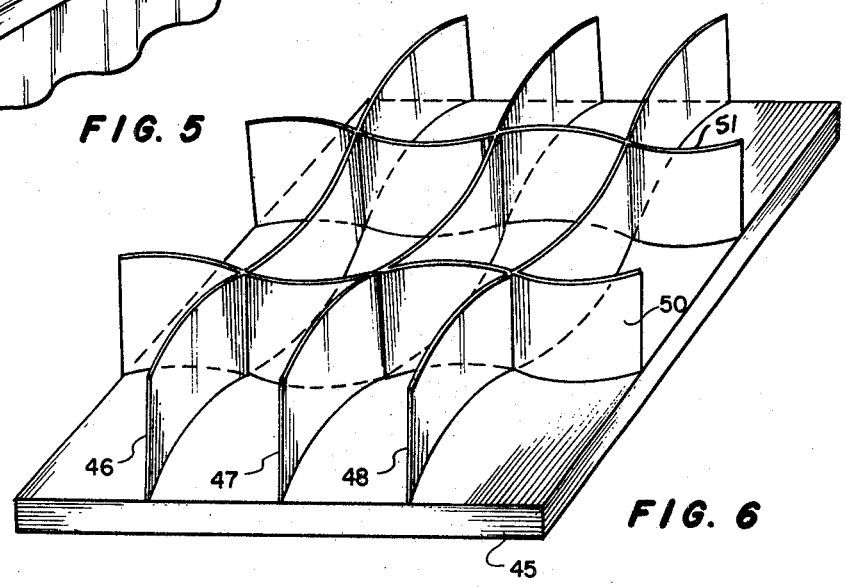
FIG. 6 is a further modified form of the invention, which provides a beam having variable spring rate along the latitude and longitudinal directions of the beam.

The illustrations of FIGS. 1 through 5 show the use of a rectangular beam; however, as pointed out above, the section of the beam may be other than rectangular, such as round, tubular, structural sections such as an I beam, H beam, T beam or the like. The structural member may, also, be a flat plate, such as illustrated in FIG. 6. In this instance, a flat plate 45 has two series of parallel corrugated members secured thereto and intersecting each other at approximately 90°, including parallel corrugated elements 46, 47 and 48, which extend approximately parallel along one extent of the plate. Approximately perpendicular is another series of parallel corrugated elements 50 and another element 51. This arrangement provides increased resistance to flexure in a longitudinal as well as lateral direction when the load is applied to any part of the plate where a fulcrum is on the side of the plate opposite the corrugated sheets or the plate is cantilevered. Each of the corrugated sheets or webs is welded to the plate continuously along the web, as described for the other figures. This, of course, gives resistance to flexure, both laterally and longitudinally of the plate.

The present invention may be useful in any structural unit where there is a large variation of load, and/or the member is required to have substantial flexure. For example, the invention is useful as a truck spring where the truck is arranged to operate with no load, a partial or a full, and even with an overload. A spring, made according to the invention, provides a variable rate of stiffness for the spring member from the no load to the overload condition. The device of the invention, also, provides an excellent bumper for a vehicle which provides a reasonable flexure under light loads, but provides increased resistance to flexure under heavy loads, such as impacts with other objects with sufficient flexure for absorbing the impact. The beam is, also, highly useful as an energy absorbing device (as in a guard rail) and the plates, according to the invention, are useful for lightweight armor which acts as an energy absorbing device absorbing the initial energy on contact with a missile.

While the invention has been described with reference to particular embodiments, there is no intent to limit the spirit of the invention to the precise details so set forth except as defined in the following claims.

I claim:

1. A flexible structural member having a variable rate of flexure or spring rate comprising a primary flexible, structural member of generally rectagular cross-section and at least one secondary member of substantially thinner section than said primary member continuously undulated from end to end secured at least longitudinally of said member forming a T-shaped section, said secondary member extending outwardly and approximately at a right angle from said primary member and secured by at least its ends to said primary member whereby flexure of said primary member also flexes said secondary member, and flexing said primary member away from said secondary member stretches said undulations, changing the rate of flexure of the structural member.

2. A flexible structural member according to claim 1 wherein said primary structural member is an elongated beam and said secondary member is a very thin section member relative to said beam.

3. A flexible structural member according to claim 2 wherein a pair of opposed undulated secondary members are secured to opposed sides of said beam.

4. A flexible structural member according to claim 1 wherein said primary structural member is a sheet, and a plurality of criss-crossed secondary members are secured thereto intersecting each other at about right angle.

5. A flexible structural member according to claim 4 wherein said plurality of secondary members are arranged in two sets, each set including a plurality of individual members mounted approximately parallel to each other, and each set mounted at approximately a right angle to the other set.

6. A flexible structural member according to claim 1 wherein said at least one secondary member is secured to said primary member completely along a joint line for the full extent thereof.

7. A flexible structural member according to claim 1 wherein at least one secondary member has undulations completely across its height and said secondary member joins said primary member along an undulating joint line.

8. A flexible structural member according to claim 1 wherein said secondary member is mounted along a straight line joint to said primary member, and the opposite edge is continuously undulated along its length.

9. A flexible structural member according to claim 1 wherein said secondary member is a thin continuously corrugated strip of sheet metal.

10. A flexible structural member according to claim 1 wherein said secondary member has a varying height.

References Cited

UNITED STATES PATENTS

| | | | |
|---|---|---|---|
| 533,321 | 1/1895 | Smyser | 105—208 |
| 1,604,151 | 10/1926 | Dornier | 52—732 |
| 3,333,389 | 8/1967 | Lichti | 52—732 XR |
| 151,771 | 6/1874 | Fox | 267—47 |
| 317,990 | 5/1885 | Graves | 267—47 |
| 929,604 | 7/1909 | Kruse | 217—31 |
| 1,256,124 | 2/1918 | Gelling | 267—47 |
| 2,308,943 | 1/1943 | Tietig et al. | 52—732 XR |
| 2,820,228 | 1/1958 | Rodman | 220—71 XR |

FOREIGN PATENTS 19,781　9/1904　Great Britain.

ARTHUR L. LA POINT, Primary Examiner

HOWARD BELTRAN, Assistant Examiner

U.S. Cl. X.R.

52—732; 267—47, 48